United States Patent
Lim et al.

(10) Patent No.: US 11,981,479 B2
(45) Date of Patent: May 14, 2024

(54) APPARATUS AND METHOD FOR FOOD STORAGE

(71) Applicant: BARKBOX, INC., New York, NY (US)

(72) Inventors: Joo Young Lim, New York, NY (US); Melissa K. Seligmann, New York, NY (US)

(73) Assignee: BARKBOX, INC., New York, NY (US)

( * ) Notice: Subject to any disclaimer, the term of this patent is extended or adjusted under 35 U.S.C. 154(b) by 0 days.

(21) Appl. No.: 17/967,137

(22) Filed: Oct. 17, 2022

(65) Prior Publication Data

US 2023/0122217 A1    Apr. 20, 2023

Related U.S. Application Data

(60) Provisional application No. 63/256,094, filed on Oct. 15, 2021.

(51) Int. Cl.
| | |
|---|---|
| *B65D 51/24* | (2006.01) |
| *A47J 47/10* | (2006.01) |
| *B65D 43/02* | (2006.01) |

(52) U.S. Cl.
CPC .......... *B65D 51/24* (2013.01); *A47J 47/10* (2013.01); *B65D 43/0229* (2013.01); *B65D 2543/00092* (2013.01); *B65D 2543/00518* (2013.01); *B65D 2543/00546* (2013.01); *B65D 2543/00851* (2013.01); *B65D 2543/00972* (2013.01)

(58) Field of Classification Search
CPC ...... A47G 19/24; B65D 51/24; B65D 71/502; B65D 41/0414; B65D 21/0228; A47J 47/10

USPC ................................................ 222/564.565
See application file for complete search history.

(56) References Cited

U.S. PATENT DOCUMENTS

| | | | |
|---|---|---|---|
| 1,139,841 A | 5/1915 | Bright | |
| 2,997,211 A | 8/1961 | Wissman | |
| 3,469,748 A * | 9/1969 | Meyers | B65D 47/185 |
| | | | D9/449 |
| 4,961,521 A * | 10/1990 | Eckman | A47G 19/24 |
| | | | 222/545 |
| 7,040,249 B1 | 5/2006 | Mushen | |
| 10,595,475 B1 | 3/2020 | Koenig et al. | |

(Continued)

OTHER PUBLICATIONS

"Dual-Lid Jar Opens at Both Ends", dornob.com, https://dornob.com/dual-lid-design-turns-jar-on-its-head-opens-at-both-ends/.

(Continued)

*Primary Examiner* — Jeffrey R Allen
(74) *Attorney, Agent, or Firm* — Grogan, Tuccillo & Vanderleeden, LLP

(57) ABSTRACT

An apparatus for the storage of food includes a body portion having a hollow interior configured to receive food, a first end, and a second end opposite the first end. The apparatus further includes a lid configured for selective engagement with the second end of the body portion and a lid assembly configured for selective engagement with the first end of the body portion. The lid assembly includes a crumb filter having a plurality of apertures configured to permit the passage of food crumbs, and a cap, which may be selectively removed from the crumb filter so that food crumbs may be discarded from the body portion.

13 Claims, 6 Drawing Sheets

(56) References Cited

U.S. PATENT DOCUMENTS

| | | | |
|---|---|---|---|
| 10,723,511 B2 | 7/2020 | Rajendran | |
| D920,746 S | 6/2021 | Seiders et al. | |
| 11,089,893 B2 | 8/2021 | Kubota et al. | |
| 2011/0186585 A1* | 8/2011 | Lu | A47J 41/00 |
| | | | 220/592.2 |
| 2011/0290805 A1 | 12/2011 | Rances | |
| 2013/0233248 A1 | 9/2013 | Veness et al. | |
| 2013/0341443 A1 | 12/2013 | Stephenson | |
| 2014/0238949 A1* | 8/2014 | Patel | B65D 81/3205 |
| | | | 215/6 |
| 2015/0251148 A1 | 9/2015 | Hodges et al. | |
| 2019/0337675 A1* | 11/2019 | Rajendran | B65D 81/3823 |

OTHER PUBLICATIONS

International Search Report dated Feb. 2, 2023 from corresponding International Application No. PCT/US22/46841.

\* cited by examiner

APPARATUS AND METHOD FOR FOOD STORAGE

CROSS-REFERENCE TO RELATED APPLICATIONS

This application claims the benefit of U.S. Provisional Patent Application No. 63/256,094, filed Oct. 15, 2021 and is related by subject matter to co-pending U.S. Design patent application Ser. No. 29/811,633, filed Oct. 15, 2021 entitled FOOD STORAGE CONTAINER, the entire contents of which are incorporated herein by reference in its entirety.

TECHNICAL FIELD

The present invention relates generally to food storage, and, in particular, to an apparatus and method for storing food that allows easy access to older food and the removal of food crumbs.

DISCUSSION OF ART

Foods such as cereal, potato/corn chips, dry pet food/treats, and the like are often stored in containers having a lid on one end and a fixed bottom surface on the opposite end. With known containers, however, older foods and food crumbs collect at the bottom of the container when the container is replenished with fresh food. After several months, the older food becomes stale and is often disposed of. As such, a need exists for a food storage container that allows access to the oldest food first as the container is filled over time. There is also a need for a food storage container that allows for easy removal of food crumbs.

BRIEF SUMMARY OF THE INVENTION

The following presents a simplified summary of the disclosed subject matter in order to provide a basic understanding of some aspects of the various embodiments described herein. This summary is not an extensive overview of the various embodiments. It is not intended to exclusively identify key features or essential features. Its sole purpose is to present concepts of the disclosure in a streamlined form as a prelude to the more detailed description that is presented later.

With this is mind, as a solution to the above technical problem, embodiments of the invention provide an apparatus and method for storing food that allows easy access to older food and the removal of food crumbs, as newer food is added.

In an embodiment, an apparatus for storing food includes a body portion having a hollow interior configured to receive food, a first end, and a second end opposite the first end. The apparatus further includes a lid configured to be selectively secured to the second end of the body portion and a lid assembly configured to be selectively secured to the first end of the body portion. The lid assembly includes a crumb filter having a plurality of apertures configured to permit the passage of food crumbs, and a cap, which may be selectively removed from the crumb filter so that food crumbs may be discarded from the body portion.

In another embodiment, a method of storing food includes placing food into a hollow interior of a body portion of a food storage apparatus via a first end of the body portion and securing a lid assembly to the first end of the body portion into which the food was placed. The method further includes inverting the body portion, so that a second end opposite the now covered first end is above the first end, and removing a cap from the lid assembly so that food crumbs may pass through apertures of a crumb filter so that they may be discarded from the body portion of the food storage apparatus.

BRIEF DESCRIPTION OF THE DRAWINGS

The present invention will be better understood from reading the following description of non-limiting embodiments, with reference to the attached drawings, wherein.

DETAILED DESCRIPTION OF THE INVENTION

Figure 1:
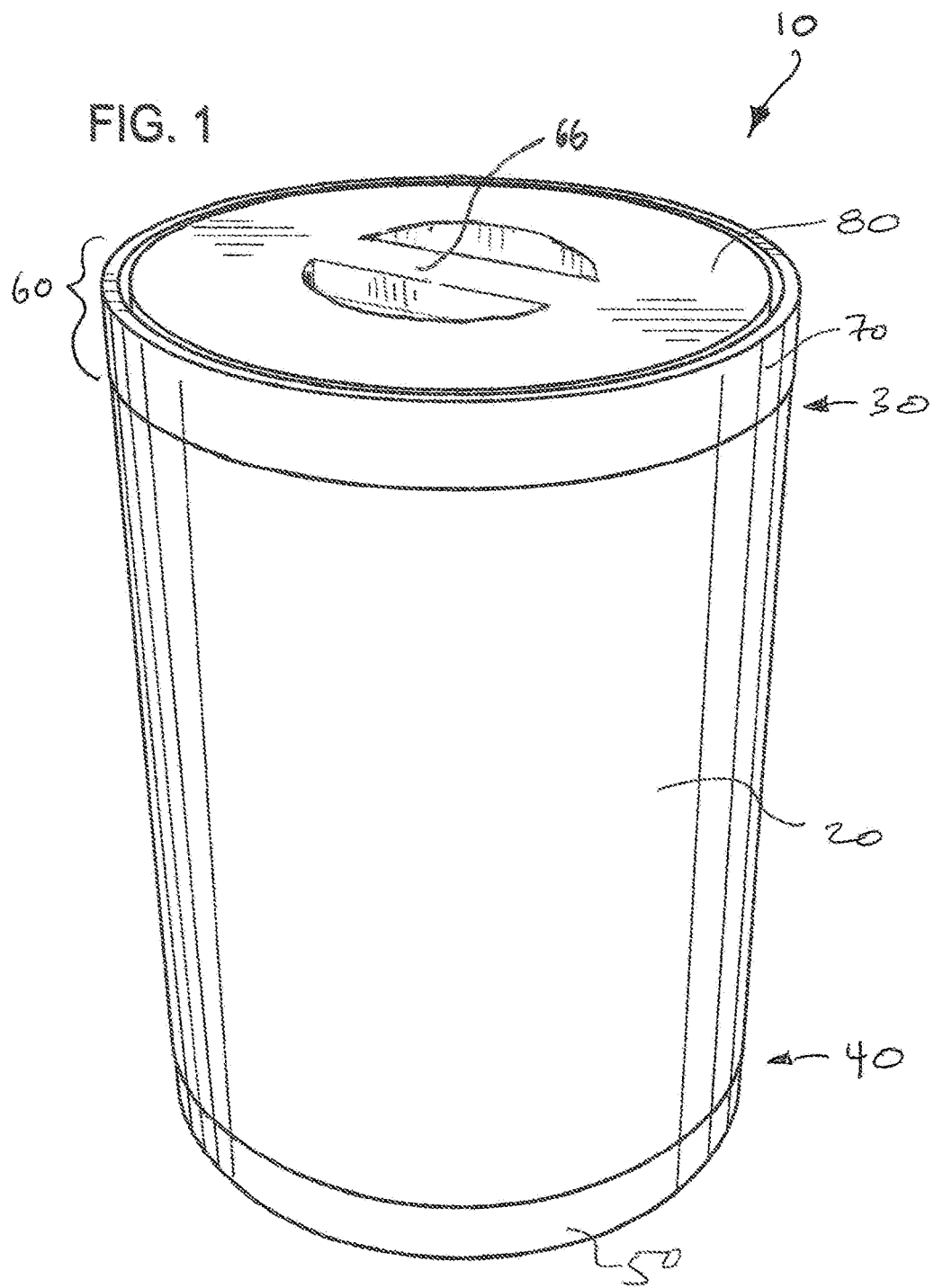
FIG. 1 is a perspective view of an apparatus for food storage according to an embodiment of the invention.

The following detailed description is exemplary in nature and is not intended to limit the described embodiments or the application and uses of the described embodiments. As used herein, the word "exemplary" or "illustrative" means "serving as an example, instance, or illustration." Any embodiment described herein as "exemplary" or "illustrative" is not necessarily to be construed as preferred or advantageous over other embodiments. All of the embodiments described below are exemplary embodiments provided to enable persons skilled in the art to make or use the embodiments of the disclosure and are not intended to limit the scope of the disclosure.

It is also to be understood that the specific apparatus and methods illustrated in the drawings, and described herein, are exemplary embodiments of the inventive concepts defined in the appended clauses. Specific dimensions and other physical characteristics relating to the embodiments are not to be considered as limiting unless stated otherwise.

Referring now to FIGS. 1-7, embodiments of the invention provide a food storage apparatus/container 10 that includes a body portion 20 having a first end 30, a second end 40, and a hollow interior 120. The first and second ends 30, 40 are open to the hollow interior 120. The hollow interior 120 is configured to receive and store a variety of foods including both human and animal foods. Such foods include, but are not limited to, cereal, potato/tortilla chips, cookies, popcorn, pet treats, and dry pet food.

Figure 2:
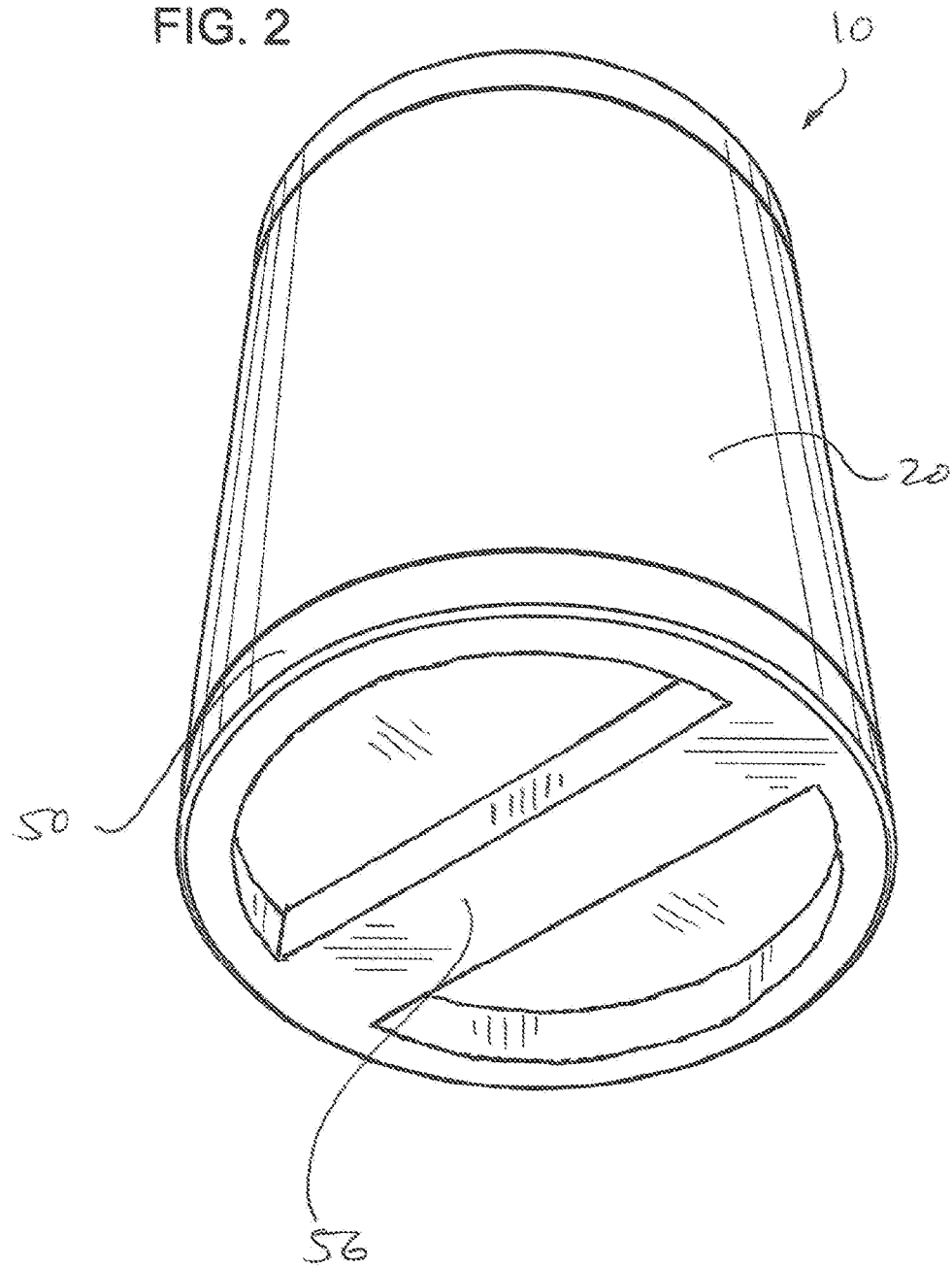
FIG. 2 is an opposite perspective view of the apparatus of FIG. 1.

The container 10 further includes a lid 50 which may be removably secured to the second end 40 of the body portion 20. Additionally, the container 10 includes a lid assembly 60 which may be removably secured to the first end 30 of the body portion 20. As shown in FIGS. 1 and 2, in embodiments, the lid 50 and lid assembly 60 include inset or recessed handle portions 56, 66, respectively, which may be used for removal purposes. As will be appreciated, the handle portions 56, 66 are inset or recessed so that the container 10 may be securely placed on a flat surface via the lid 50 and/or lid assembly 60.

Figure 3:
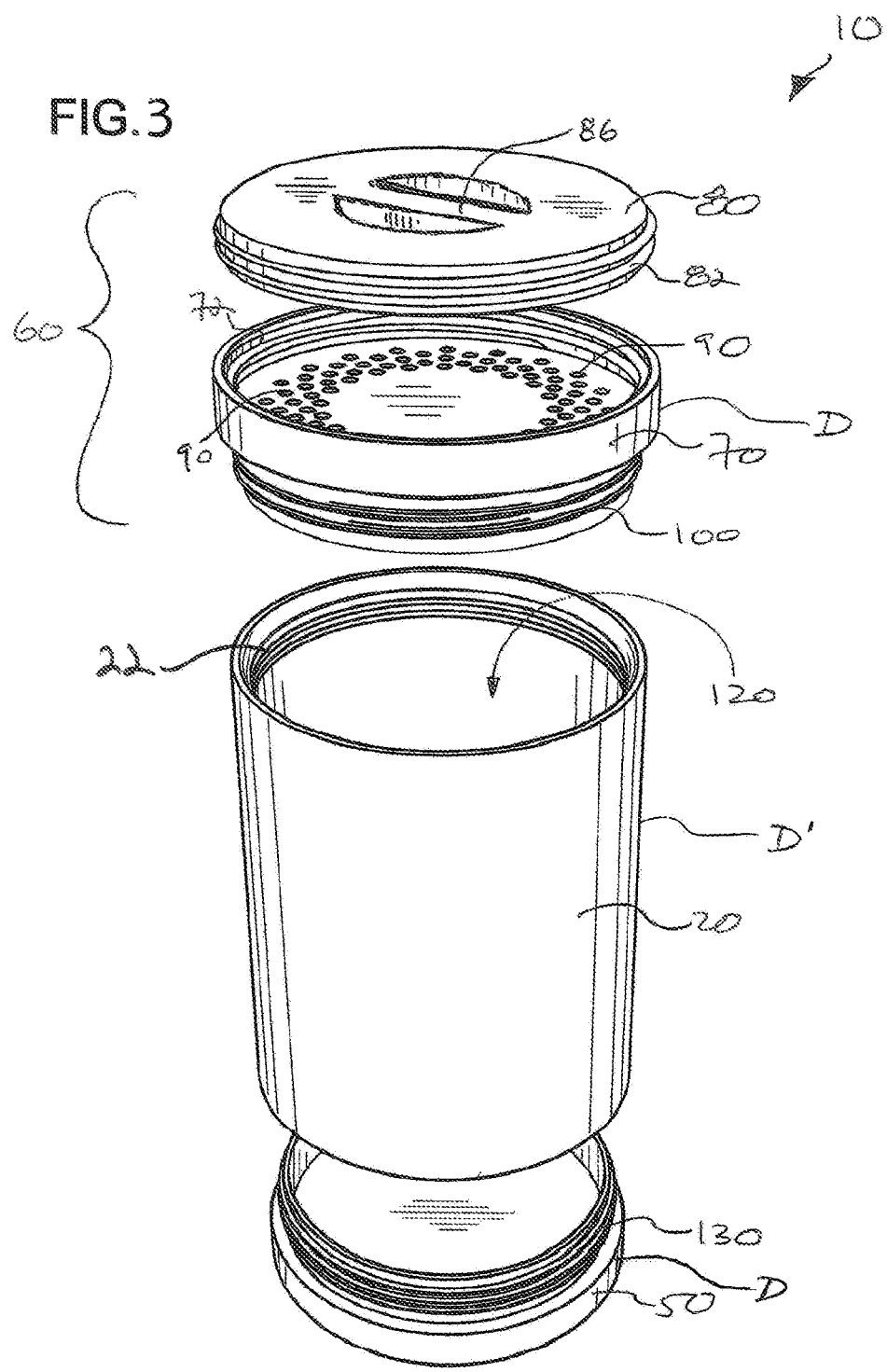
FIG. 3 is an exploded perspective view of the apparatus of FIG. 1.
Figure 4:
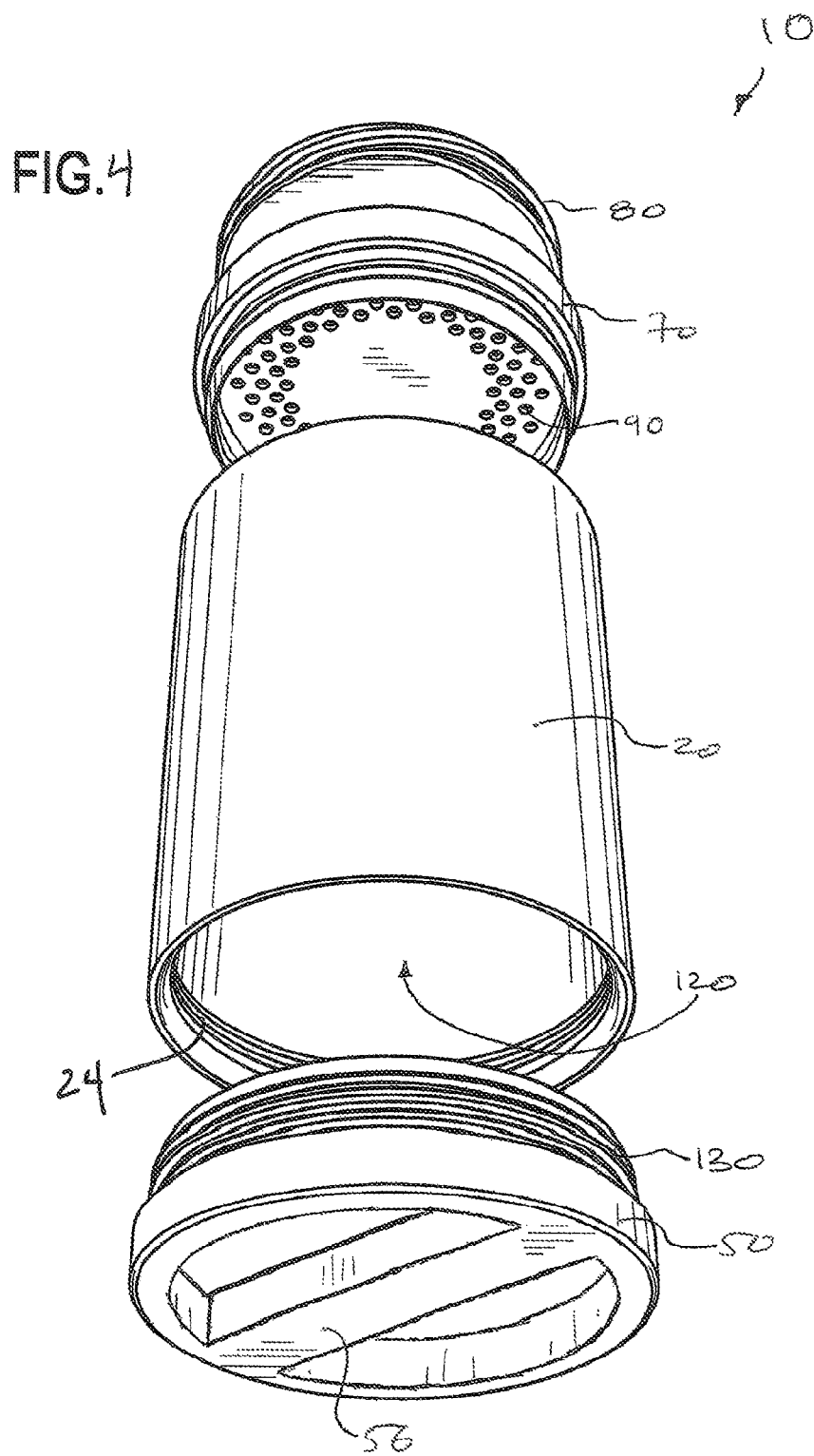
FIG. 4 is an opposite exploded view of the apparatus of FIG. 1.
Figure 5:
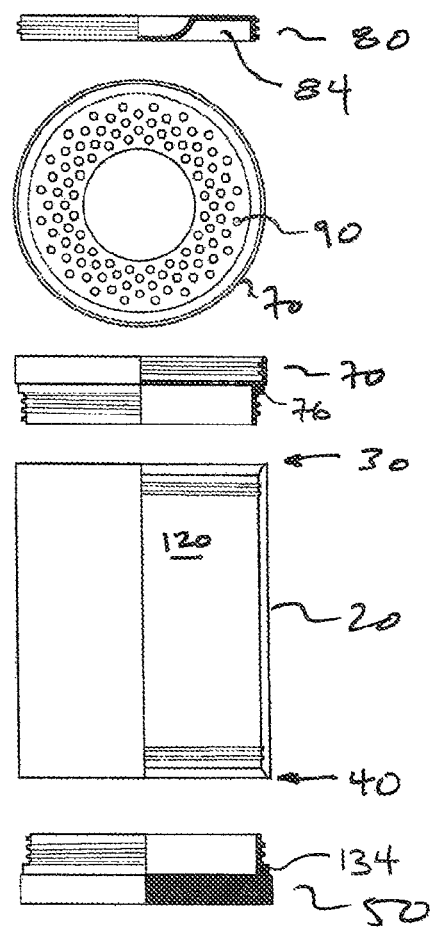
FIG. 5 is a partially cut away exploded view of the apparatus of FIG. 1.

Turning now to FIG. 3, the lid assembly 60 includes a removable crumb filter 70 and a cap 80. The crumb filter 70 includes a series of perforations or apertures 90 that are sized and shaped to allow for the passage of food crumbs out of the body portion 20, while larger pieces of food are retained in the body portion 20. As shown, in an embodiment, the apertures 90 are located about a perimeter of the crumb filter 70 with a center portion of the filter 70 being aperture-less. As will be appreciated, the size and shape of the apertures 90 may vary depending on the type/size of food that is intended to be stored in the container 10. In specific embodiments, the apertures may be sized and shaped to allow passage of crumbs associated with dry pet food and/or dry pet treats. In a particular embodiment, the apertures 90 have a diameter of approximately 4 mm.

As shown, the crumb filter 70 further includes a stepped attachment portion 100 that includes threads 74 (FIG. 6) which are configured to selectively engage threads 22 located in the hollow interior 120 at the first end 30 of the body portion 20. In embodiments, the crumb filter 70 is configured such that an outer diameter D of the filter 70 is substantially the same as an outer diameter D' of the body portion 20 when the stepped attachment portion 100 is threaded into the hollow interior 120. As will be appreciated, the thread containing stepped attachment portion 100 has an outer diameter that is less than D/D'.

As mentioned, the lid assembly 60 further includes a cap 80. The cap 80 also includes a plurality of threads 82 which are configured to engage corresponding threads 72 that are located on an interior portion 170 (FIG. 6) of the crumb filter 70 that is configured to receive the cap 80. The cap 80 has an interior cavity 84 (FIG. 5) that can receive food crumbs from the body portion 20. The cap 80 is sized and configured to fit within the interior portion 170 of the crumb filter 70.

As will be appreciated, the cap 80 may be removed from the crumb filter 70 while the crumb filter 70 remains attached to the body portion 20. By removing the cap 80, while retaining the crumb filter 70 on the body portion 20, food crumbs may exit the container 10, while food remains in the hollow interior 120.

The lid 50 is configured for attachment to the second end 40 of the body portion 20. The lid 50 includes a stepped attachment portion 130 that, in embodiments, includes threads 132 (FIG. 7), that are configured to selectively engage corresponding threads 24 located in the hollow interior 120 at the second end 40 of the body portion 20. In embodiments, the lid 50 is configured such that an outer diameter D of the lid 50 is substantially the same as the outer diameter D' of the body portion 20 when the stepped attachment portion 130 is threaded into the hollow interior 120. As will be appreciated, the thread containing stepped attachment portion 130 has an outer diameter that is less than D/D'.

Figure 6:
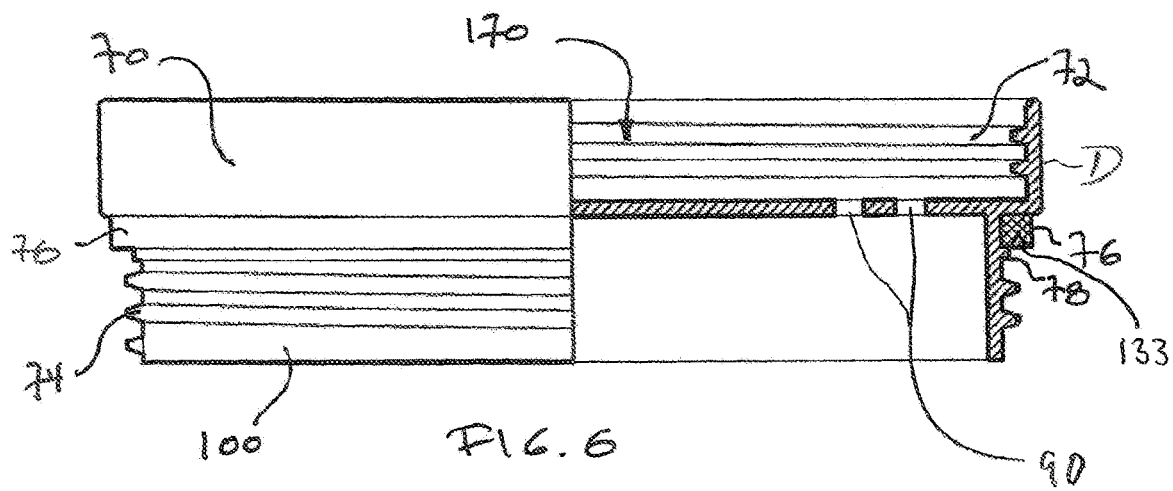
FIG. 6 is an enlarged partially cut away view of a crumb lid of a lid assembly of the apparatus of FIG. 1.
Figure 7:
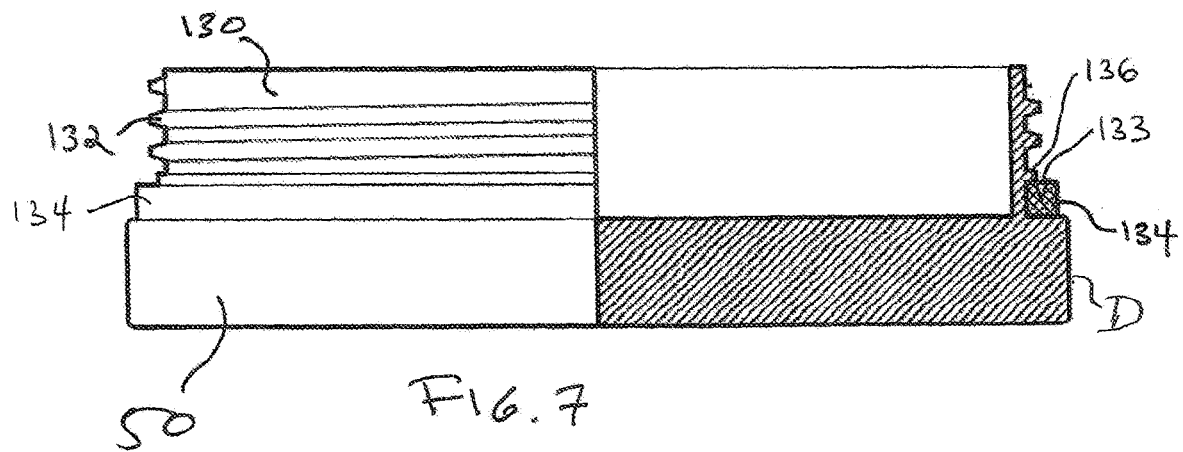
FIG. 7 is an enlarged partially cut away view of a lid of the apparatus of FIG. 1.

Referring now to FIGS. 6 and 7, in embodiments, the crumb filter 70 and the lid 50 include compressible annular gaskets 76, 134. The gaskets 76, 134 are retained via shoulders 78, 136 which secure the gaskets 76, 134 in place between the stepped engagement portions 100, 130 and the portions of the lid 50 and lid assembly 60 having the larger outer diameter D. In embodiments, the gaskets 76, 134 include a groove 133 that extends circumferentially around the gaskets 76, 134. As will be appreciated, the grooves facilitate a relatively tight pressure fit of the gaskets 76, 134 when the lid 50 and crumb filter 70 are fully secured to the body portion 20. The gaskets 76, 134 are configured to preserve food freshness and inhibit food in the container 10 from becoming stale. In embodiments, the gaskets 76, 134 are silicone, but other suitable materials may be employed.

While embodiments of the inventive food storage container 10 are depicted utilizing threaded engagement between the various components, in other embodiments, different attachment mechanisms may be employed. For example, in certain embodiments one or more of the components, e.g., lid 50, cap 80, and/or removable crumb filter 70, may be secured to the body portion 20 via an interference or friction fit.

In certain embodiments, the crumb filter 70 and/or the lid 50 may have a textured exterior to facilitate gripping and removing the filter 70 or lid 50 from the body portion 20. For example, one or more notches, recesses, or grooves may be circumferentially arranged about the filter 70 or lid 50.

In an embodiment, the body portion 20, lid 50, and lid assembly 60 have outer diameters (D, D') that are substantially the same. In an exemplary embodiment configured to receive dry pet treats, the outer diameters D, D' are approximately 127 mm. In this same embodiment, the overall height of the food storage container 10 is approximately 190.5 mm.

As will be appreciated, the body portion 20, lid 50, and lid assembly 60 may be manufactured from a variety of materials including plastics, stainless steel, aluminum, bamboo, post-consumer plastic and other suitably durable materials. The body portion 20 is shown in a cylindrical conformation, but may be formed in a variety of shapes, e.g., hexagonal, square, or other forms. In certain embodiments, the body portion 20 may be one material, e.g., stainless steel, and the lid 50 and lid assembly 60 may be another, e.g., plastic.

In use, the lid assembly 60 is removed from the body portion 20 and food, e.g., cereal, pet treats, etc., is placed into the hollow interior 120 of the container 10. The lid assembly 60 is then secured to the body portion 20 and the body portion 20 is inverted so that the lid 50 is now situated at the top of the container 10 and lid assembly 60 is at the bottom. The lid 50 may now be removed to access food stored inside the container 10, with the older food being on top of newer food. Moreover, the cap 80 may be removed from the lid assembly 60 so that food crumbs can pass through the apertures of a crumb filter so that they may exit the bottom of the container 10 and be discarded.

When the container 10 is low on food and replenishment is desired, the container 10 is inverted again so that the lid assembly 60 end is on top. The lid assembly 60 is then removed, new food added, and the container 10 is inverted again so that lid 50 is on now top of the container 10.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended clauses below. For example, references to "an embodiment" or "one embodiment" of the present invention are not intended to be interpreted as excluding the existence of additional embodiments that also incorporate the recited features.

In the appended clauses, the terms "including" and "in which" may be used as the plain-English equivalents of the respective terms "comprising" and "wherein." Moreover, in the following clauses, terms such as "first," "second," "bottom," "top," etc. are merely labels, and are not intended to impose numerical or positional requirements on their objects. The terms "substantially," "generally," "approximately," and "about" indicate conditions within reasonably achievable manufacturing and assembly tolerances, relative to ideal desired conditions suitable for achieving the functional purpose of a component or assembly.

What has been described above includes examples of apparatus and methods illustrative of the disclosed subject matter. It is, of course, not possible to describe every combination of components or methodologies here. One of ordinary skill in the art may recognize that many further combinations and permutations of the recited subject matter are possible. Furthermore, to the extent that the terms "includes," "has," "possesses," and the like are used in the detailed description, clauses, and drawings, such terms are intended to be inclusive in a manner similar to the term "comprising" as "comprising" is interpreted when employed as a transitional word in clause. That is, unless explicitly stated to the contrary, embodiments "comprising," "including," or "having" an element or a plurality of elements having a particular property may include additional such elements not having that property.

What is claimed is:

1. An apparatus for the storage of food, comprising:
    a body portion having a hollow interior configured to receive food, a first end, and a second end opposite the first end, wherein an inner wall of the hollow interior of the body portion at both the first end and the second have a threaded surface disposed thereon;
    a lid configured to be selectively secured to the second end of the body portion; and
    a lid assembly configured to be selectively secured to the first end of the body portion, the lid assembly including a removable crumb filter having a plurality of apertures configured to permit the passage of food crumbs, wherein the crumb filter includes a panel containing the plurality of apertures that spans across the body portion to cover the hollow interior thereof, a first annular flange encircling a first side of the panel and extending away from an outer periphery of the panel, an interior wall of the first annular flange encircling the first side of the panel having a threaded surface disposed thereon, a second annular flange encircling a second side of the panel opposing the first side of the panel and extending away from an inner periphery of the panel on the second side in a direction opposite of a direction that the first annular flange extends away from the outer periphery of the first side of the panel, an interior wall of the second annular flange encircling the second side of the panel having a threaded surface disposed thereon that is configured to threadably engage with the threaded surface of the inner wall of the hollow interior of the body portion at the first end for securing the second annular flange within the hollow interior of the body portion, and a cap, which may be selectively removed from the crumb filter so that food crumbs may be discarded from the body portion, the cap having a threaded outer periphery that is configured to threadably engage with the threaded surface on the interior wall of the first annual flange for securing the threaded surface of the cap within the first annular flange.

2. The apparatus of claim 1, wherein the lid includes a recessed handle to facilitate removal of the lid from the second end of the body portion.

3. The apparatus of claim 1, wherein the cap of the lid assembly includes a recessed handle to facilitate removal of the cap.

4. The apparatus of claim 1, wherein the crumb filter is configured to threadably disengage with the hollow interior at the first end of the body portion thereby allowing the lid assembly to be removed from the body portion.

5. The apparatus of claim 1, wherein the crumb filter has a compressible gasket to preserve food freshness and inhibit food in the body portion from becoming stale when the lid assembly is secured to the body portion.

6. The apparatus of claim 1 wherein the lid is configured to threadably disengage with the hollow interior at the second end of the body portion thereby allowing the lid removed from the body portion.

7. The apparatus of claim 1, wherein the lid has a compressible gasket to preserve food freshness and inhibit food in the body portion from becoming stale when the lid is secured to the body portion.

8. The apparatus of claim 1, wherein the cap is configured to threadably disengage from the interior wall of the first annual flange of the crumb filter.

9. The apparatus of claim 1, wherein the body portion is substantially cylindrical.

10. The apparatus of claim 1, wherein the body portion, lid assembly, and lid all have substantially the same outer diameter.

11. The apparatus of claim 1, wherein the apertures have a diameter of approximately 4 mm.

12. A method of storing food, comprising:
    providing a food storage apparatus, including:
        a body portion having a hollow interior configured to receive food, a first end, and a second end opposite the first end, wherein an interior wall of the hollow interior of the body portion at both the first end and the second have a threaded surface disposed thereon;
        a lid configured to be selectively secured to the second end of the body portion; and
        a lid assembly configured to be selectively secured to the first end of the body portion, the lid assembly including a removable crumb filter having a plurality of apertures configured to permit the passage of food crumbs, wherein the crumb filter includes a panel containing the plurality of apertures that spans across the body portion to cover the hollow interior thereof, a first annular flange encircling a first side of the panel and extending away from an outer periphery of the panel, an interior wall of the first annular flange encircling the first side of the panel having a threaded surface disposed thereon, a second annular flange encircling a second side of the panel opposing the first side of the panel and extending away from an inner periphery of the panel on the second side in a direction opposite of a direction that the first annular flange extends away from the outer periphery of the first side of the panel, an interior wall of the second annular flange encircling the second side of the panel having a threaded surface disposed thereon that is configured to threadably engage with the threaded surface of the inner wall of the hollow interior of the body portion at the first end for securing the second annular flange within the hollow interior of the body portion, and a cap, which may be selectively removed from the crumb filter so that food crumbs may be discarded from the body portion, the cap having a threaded outer periphery that is configured to threadably engage with the threaded surface on the interior wall of the first annual flange for securing the threaded surface of the cap within the first annular flange;

placing food into the hollow interior of the body portion of the food storage apparatus via the first end of the body portion;

securing the lid assembly to the first end of the body portion into which the food was placed;

inverting the body portion so that the second end opposite the now covered first end is above the first end; and removing the cap from the lid assembly so that food crumbs may pass through apertures of the crumb filter so that they may be discarded from the body portion of the food storage apparatus.

13. The method of claim 12, further comprising:

inverting the body portion so that the first end is again above the second end;

removing the lid assembly and placing food into the hollow interior of the body portion to replenish consumed food; and inverting the body portion so that the second end is above the first end.

\* \* \* \* \*